United States Patent
Hoffmann et al.

(10) Patent No.: US 6,948,433 B2
(45) Date of Patent: Sep. 27, 2005

(54) CONVEYOR COMPONENTS

(76) Inventors: Frank F. Hoffmann, 2501 Clinton Ave., St. Clair, MI (US) 48079; Arnold R. Hoffmann, 274 Longford, Rochester, MI (US) 48309; William E. F. Thurber, Jr., 131 Abbey Gate, Cotuit, MA (US) 02635; Richard Somerville, 334 Keene St., Duxbury, MA (US) 02332

( * ) Notice: Subject to any disclaimer, the term of this patent is extended or adjusted under 35 U.S.C. 154(b) by 0 days.

(21) Appl. No.: 10/350,513

(22) Filed: Jan. 24, 2003

(65) Prior Publication Data

US 2003/0101895 A1 Jun. 5, 2003

Related U.S. Application Data

(63) Continuation of application No. 09/721,690, filed on Nov. 24, 2000.
(60) Provisional application No. 60/167,291, filed on Nov. 24, 1999.

(51) Int. Cl.[7] .............................................. B61B 3/00
(52) U.S. Cl. ...................................... 105/148; 384/292
(58) Field of Search .............................. 104/89, 93, 94, 104/95; 105/148, 154; 198/722; 384/286, 292, 129, 264, 373; 193/37

(56) References Cited

U.S. PATENT DOCUMENTS

| 670,382 | A | * | 3/1901 | Caldwell | 384/292 |
|---|---|---|---|---|---|
| 1,132,759 | A | * | 3/1915 | Bache | 384/292 |
| 1,184,406 | A | * | 5/1916 | Bache | 384/292 |
| 1,674,453 | A | * | 6/1928 | Sloper | 384/292 |
| 1,877,495 | A | * | 9/1932 | Cater | 384/292 |
| 3,578,828 | A | * | 5/1971 | Orkin et al. | 384/129 |
| 3,709,573 | A | * | 1/1973 | Orkin et al. | 384/264 |
| 4,558,960 | A | * | 12/1985 | Lehtinen et al. | 384/373 |
| 4,664,252 | A | * | 5/1987 | Galbraith | 198/722 |
| 5,156,533 | A | * | 10/1992 | Hoffman et al. | 105/148 |
| 5,398,618 | A | * | 3/1995 | McMullen | 105/148 |
| 5,516,213 | A | | 5/1996 | Moriyama et al. | 384/292 |
| 5,524,740 | A | | 6/1996 | Conley | 193/37 |

* cited by examiner

*Primary Examiner*—Lars A. Olson
(74) *Attorney, Agent, or Firm*—Warn Hoffmann Miller & LaLone PC

(57) ABSTRACT

A non-metallic conveyor component is provided. The conveyor component includes an inner race and an outer race. The inner race includes an outer bearing surface. The outer race includes and inner bearing surface. One of the outer and inner bearing surfaces includes a helical groove. The inner and outer races are made from a polymeric matrix material having an alloying additive.

21 Claims, 2 Drawing Sheets

CONVEYOR COMPONENTS

This application is a continuation of and is based on and claims priority in U.S. application Ser. No. 09/721,690 filed Nov. 24, 2000.

BACKGROUND OF THE INVENTION

1. Field of the Invention

The present invention relates to conveyor components. More specifically, the present invention relates to novel conveyor components such as trolley wheels, roller turn rollers or roll-turn rollers, guide rollers, wheels for enclosed track chain and other conveyor components having relative rotational movement. The inventive components also include a novel bearing.

2. Description of the Prior Art

The present invention relates to conveyor components, and specifically non-metallic conveyor components that have rotating components. These include trolley wheels, guide rollers, wheels for enclosed track chain, CC5 chain rollers, flat top chain rollers, Fata belt rollers, hand push trolleys, traction wheel bearings, drive backup rollers, roller conveyors and roller turn rollers.

Traditionally, conveyor components, such as those identified above are made of metal. They employ conventional ball bearings or roller bearings on the rotating or pivoting components. Conventional components are disadvantageous because they are relatively heavy, relatively noisy, and require frequent lubrication.

Non metallic trolley wheels are known in the art. For example, applicant's prior U.S. Pat. No. 5,156,533 discloses a plastic trolley wheel. This patent shows both a plastic inner sleeve and a plastic outer wheel. The inner sleeve is formed in two sections requiring a space therebetween.

Other patents disclosing plastic conveyor components include U.S. Pat. Nos. 4,433,627 and 3,738,477.

Heretofore, plastic conveyor components such as trolley wheels have been commercially unsuccessful for a myriad of reasons. These include lack of strength, galling and inoperability of the components over wide application ranges of heat, weight, etc.

SUMMARY OF INVENTION AND ADVANTAGES

According to the present invention, there is provided a non-metallic conveyor components comprising a race having a bearing surface wherein the bearing surfaces comprises matrix material and at least one additive. The conveyor component also includes a bearing surface having at least one groove thereon.

One advantage of the present invention is that the application of the matrix with the additive will produce a component having superior wear and lubricity properties that can be used to replace conventional ball bearings or roller bearings.

Another advantage of one embodiment of the present invention is that it provides a bearing surface having at least one groove. The groove helps reduce the friction on the bearing surfaces. This helps prevent galling of the material at the bearing surface.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
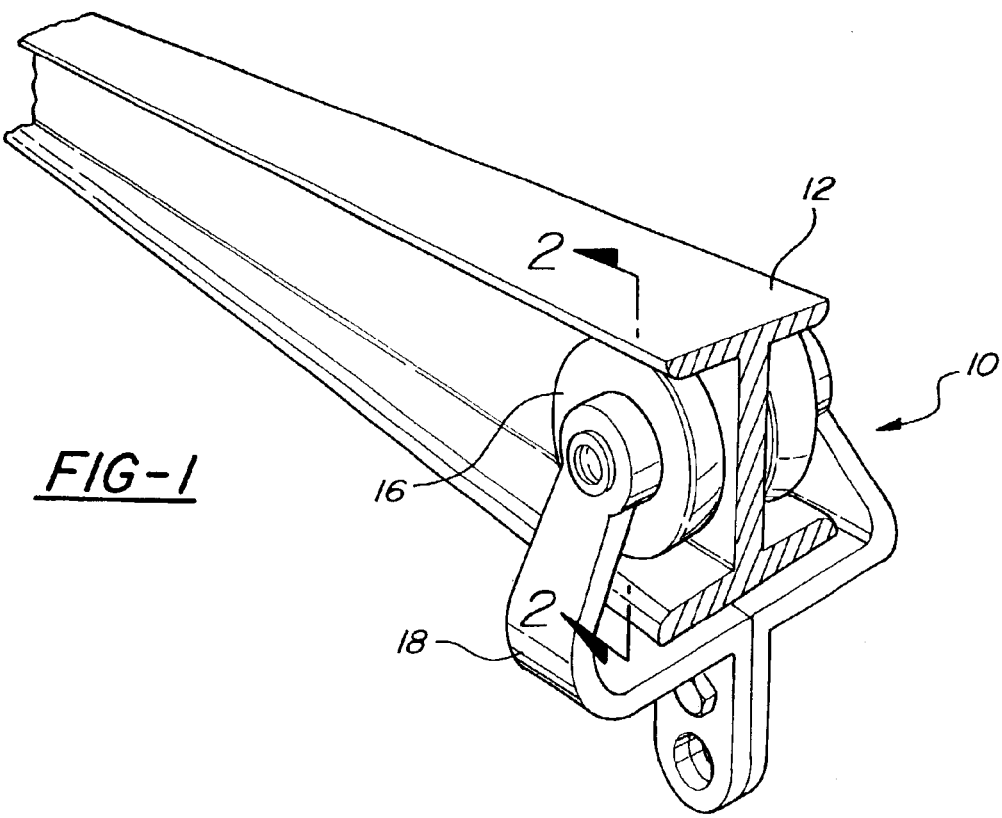
FIG. 1 is a perspective view of one embodiment of an overheard conveyor assembly.
Figure 2:
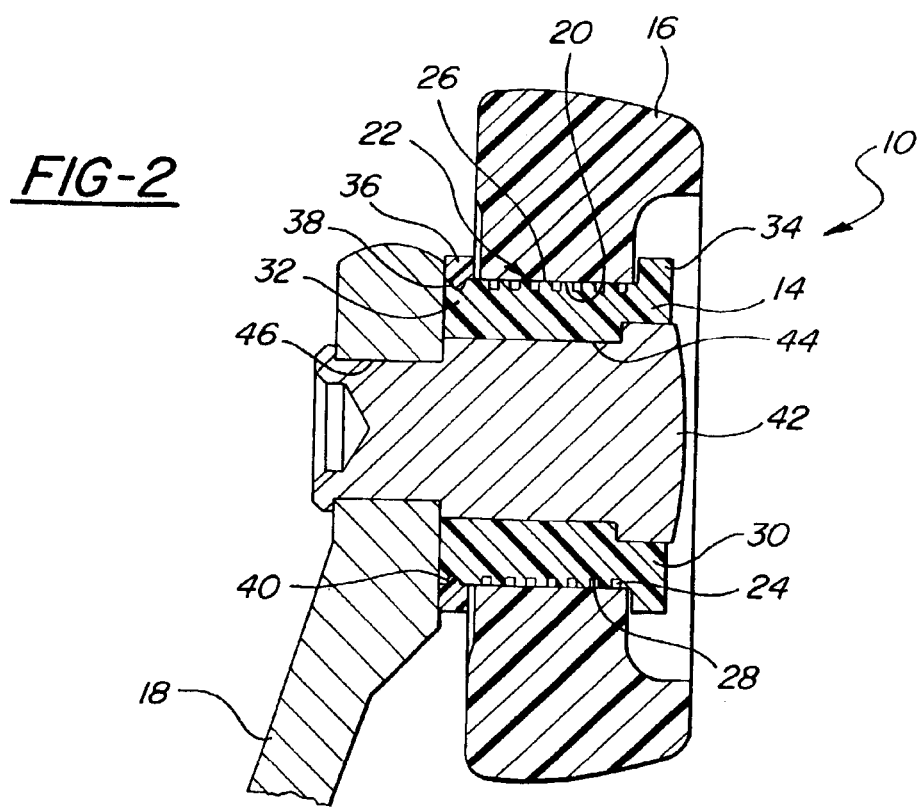
FIG. 2 is a cross-sectional view of the trolley taken along lines 2—2 of FIG. 1.
Figure 3:
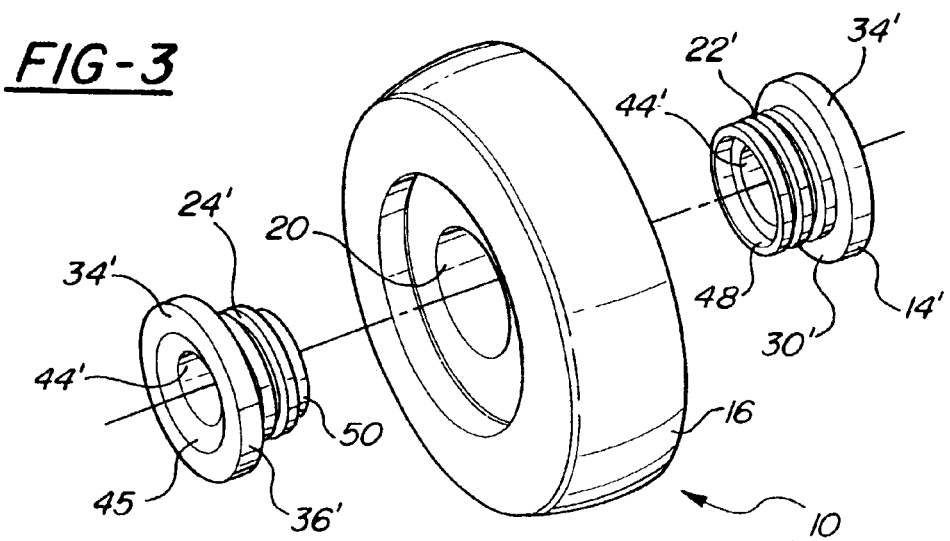
FIG. 3 is an exploded view of an alternate inner race assembly.

Various conveyor components in accordance with the present invention are generally shown in the drawings. FIGS. 1–3 generally show a trolley wheel assembly at 10. The trolley wheel rides on a rail system as is well known in the art.

Each trolley wheel assembly 10 includes an inner race or sleeve 14 and an outer race 16. The outer race 16 is supported on the inner race 14 and rotates about the inner race 14.

Figure 5:
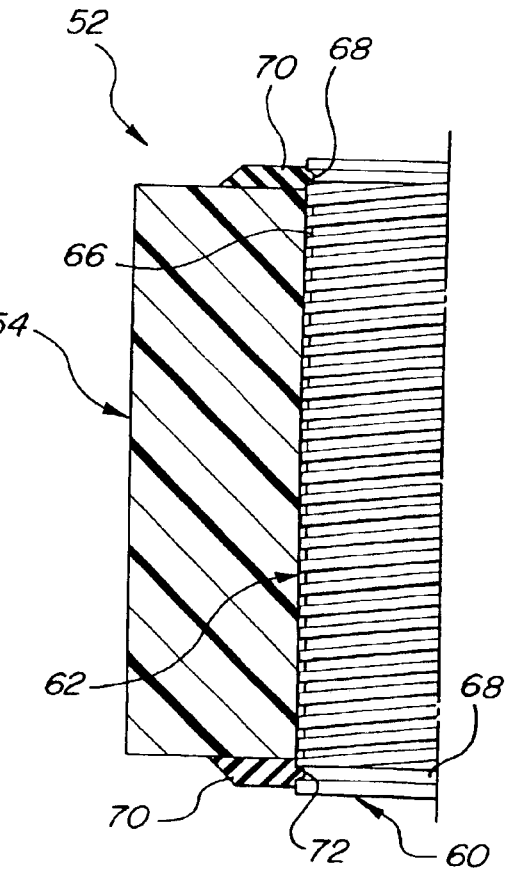
FIG. 5 is a cross sectional view taken along lines 5—5 of FIG. 4.

FIG. 2 shows one preferred embodiment of the trolley wheel assembly 10. The outer race 16 includes an inner bearing surface 20. The inner race 14 includes an outer bearing surface generally indicated at 22. The outer bearing surface 22 on the inner race 14 includes at least one groove 24. In the preferred embodiment, the groove 24 is helical. (This is best shown in FIGS. 3 and 5).

The groove 24 resembles a thread system with a profile resembling a stub Acme thread system. The thread has a profile that is optimized to reduce friction between the inner bearing surface 20 of the outer race 16 and the outer bearing surface 22 of the inner race 14, best shown in FIG. 2. In the preferred embodiment, the crest 26 of the bearing surface is flat. Similarly, the groove 24 has a flat inner surface 28. It will be appreciated, however that the profiles of the crest 26 and inner surface 28 of the groove 24 may take any configuration within the scope of the present invention. Similarly, the threads of the groove are shown flat. These too may take any configuration within the scope of the present invention.

In the preferred embodiment, the groove 24 is helical. IT will be appreciated that the groove 24 may also take other configurations. For example, the groove 24 may comprise a series of annular grooves on the outer bearing surface 22. Also the groove 24 may just comprise a series of indentations on the outer bearing surface 22. Similarly, the groove 24 may comprise a series of raised areas on the outer bearing surface 22.

The primary purpose of the groove 24, whatever its configuration, is to reduce the surface area of contact between the inner bearing surface 20 of the outer race 16 and the outer bearing surface 22 of the inner race 14. This reduces friction on the bearing surfaces and helps prevent galling. The depth of the groove, or height of the raised areas, should be sufficient to ensure a spacing between the rotating components. The spacing between the crests 26 may vary, but should allow for sufficient contact to support the outer race 16, yet allow for sufficient reduction in contact area between the respective bearing surfaces. To achieve this result, it is preferred that the effective contact area of the bearing surfaces not exceed one and one-half times the diameter of the bearing surface.

One example of such a helical groove for a four inch trolley wheel is for the groove to resemble an Acme Thread System with a pitch of between 0.0500 inch and 0.2857 inch; profile thickness at width of flat at crest of major bearing surface of between 0.0250 inch and 0.1667 inch; and the width of flat at root of major bearing surface of between 0.024 inch and 0.164 inch.

As set forth above, the preferred groove 24 is helical. This allows the forces applied to the bearing surface to be uniformly dispersed. that is, there is no point contact between the crests 26 of the groove 24 and the inner bearing surface 24 of the outer race 16. Rather, as the outer race 16 rotates relative to the inner race 14, the bearing contact surfaces between the inner 14 and outer 16 races constantly change.

FIG. 2 shows one preferred embodiment of the inner race 14. IN this embodiment, the inner race 14 is made of two components. The first component 30 comprises a tubular sleeve 32 with an integral annular end flange 34. The second component 36 comprises an annular ring having a projection 38 thereon. The tubular sleeve 32 also includes a snap groove 40 for receiving the projection 38 of the annular ring 36. In this manner, the annular ring 36 can be snap fit about the exterior of the tubular sleeve 32 to complete the inner race 14. When assembled, the inner race 14 fits into an opening in the outer race 16 and the end flange 34 and annular ring 36 trap the outer race 16 therebetween.

In assembling the trolley assembly 10, the tubular sleeve 32 is inserted into the opening in the outer race 16 until the annular end flange 34 contacts the inner race 14. The annular ring 36 is then snap fit over the end of the tubular sleeve 32 such that the projection 38 is placed in the snap groove 40. Once the annular ring 36 is connected, the inner 14 and outer 16 races or secured together. A rivet 42 is then placed through the inner opening 44 in the inner race 14. The opening 44 may have an enlarged area for receiving the head of the rivet 42. Further, the shape of the enlarged area may be keyed such as by having a hexagonal or octagonal configuration. Similarly, the head of the rivet 42 may have a geometry that matches the keyed configuration of the opening 44. In this manner, relative rotation between the rivet 42 and inner race 14 can be prevented. The rivet 42 is then placed through an opening 46 in the bracket 18. The rivet 42 can then be swaged or otherwise connected at the outer end to connect the rivet 42 the bracket 18. While a rivet 42 has been disclosed, it will be appreciated that any connecting member, such as a trunnion, and nut bolt or pin may also be used to secure the inner 14 and outer 16 races to the bracket 18 within the context of the present invention.

FIG. 3 shows a second preferred embodiment of the inner race 14. In this preferred embodiment, the inner race 14' comprises two sleeve halves 30',36'. One sleeve half 30' may have an annular recess 48 for receiving an annular projection 50 on the other sleeve half 36'. Thus, the annular projection 50 is inserted into the annular recess 48 to mate the halves 30' and 36'. Each sleeve half 30',36' includes an outer bearing surface 22' including the groove 24' thereon. Each sleeve half 30',36' also includes an annular flange 34'. It is preferred that the sleeve 14 be made in two components for each of assembly.

In assembling the trolley assembly 10, each inner sleeve half 30',36' is inserted from opposites sides of the outer race 16 into the passageway of the outer race 16 until the projection 50 section the recess 48. The annular flanges 34' remain on the outside of the outer race 16 and serve to locate the sleeve halves 30',36' relative to the outer race 16. The annular flanges 34' also aid in the connection of the outer race 16 with a bracket (not shown in FIG. 3). More specifically, each sleeve half 30',36' includes an inner passageway 44'. The inner passageway 44' is adapted to receive a connecting member (not shown) such as a bolt, pin or rivet, as is well known in the art. The connecting member is also adapted to be connected with a bracket (as, for example, as shown in FIG. 2). To assemble the trolley wheel assembly 10, the sleeve halves 30',36' are located in the opening of the outer race 16. The outer bearing surface 22' and specifically the crests of the groove, contact the inner bearing surface 20 of the outer race 16. The connecting member is then placed through the inner passageway 44' and connected to the bracket, in any well-known manner. The connecting member is then secured to the assembly in any manner well known in the art.

As shown in FIG. 3, one half 36' has a conical surface 45. The conical surface 45 is for receiving a connecting bolt, trunnion, pin or the like. The connecting member may be swaged into the conical surface. In this embodiment, the connecting member is inserted from the bracket side of the assembly 10 and is secured to the one half 36'.

In operation, once the trolley wheel assembly 10 is assembled, the assembly 10 is paired with another assembly 10 and connected to the rail 12. Each outer race 16 rotates about its respective inner race 14. It is intended that once the assembly 10 is made, the force on the connecting member, securing the inner race 14 with the bracket 18 (such as by swaging), will prevent relative rotational movement between the inner race 14 and the connecting member such as the rivet described above. Further, the use of a keyed opening 44 and corresponding shaped rivet will prevent such relative rotational movement of the inner race 14. However, there may be some relative rotational movement between inner race 14 and the connecting member. In any event, the outer race 16, however, is free to rotate about the outer surface 22 of the inner race 14. That is, the connecting member secures the inner race 14 to the bracket 18. It does not apply a force to the outer race 16 itself. Rather, the outer race 16 is entrapped by the opposing annular flange 34 and annular ring 36 or the annular flanges 34' on the opposite sleeve components 30,36 and 30',36' respectively. The outer race 16 is free to rotate there-between.

The groove 24 is shown to be on the outer bearing surface 22 of the inner race 14. It will be appreciated that the groove 24 can similarly be on the inner bearing surface 20 of the outer race 16. If this is the case, then the outer bearing surface 22 of the inner race 14 will preferably have a smooth exterior profile. That is, only one of the inner bearing surface 24 of the outer race 16 or the inner bearing surface 22 of the inner race 14 need have the groove 24 thereon.

Also, the inner race 14 may have an additional annular groove on one or both of the annular flanges for receiving a sealing member of the type discussed in connection with the roller turn roller below. The sealing member may seal the opening through the outer race 16 so as to prevent debris from entering the opening.

Figure 4:
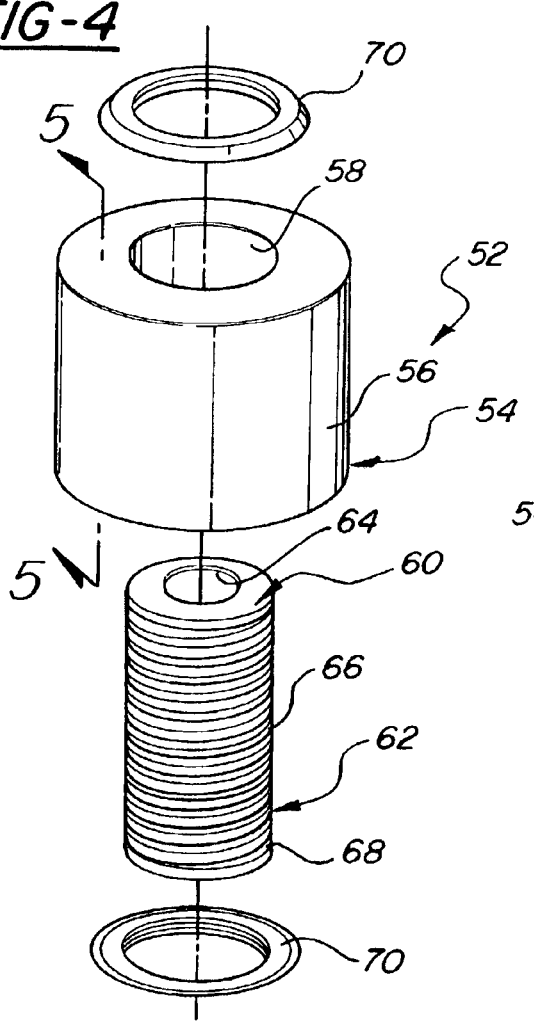
FIG. 4 is an exploded view of one embodiment of a roller turn roller made in accordance with the present invention.

FIGS. 4 and 5 generally show another conveyor component known as a roller turn roller or roll-turn roller. The roller turn roller is generally shown at 52. Generally, the roller turn roller 52 is similar to the trolley wheel assembly 10 described above, except that its outer surface is more elongated. Also, rather than being connected to a bracket, the roller turn roller 52 is connected to a suitable support structure as is well known in the art.

The outer portion or race of the roller turn roller is generally indicated at 54. The outer surface 56 of the outer race 54 is adapted to receive the forces from other conveyor components, such as the connecting chain, in a manner that is well known in the art. The outer race 54 includes an inner bearing surface 26. The inner bearing surface 56 is defined on an inner passageway through the outer race 54.

The roller turn roller also includes an inner race or sleeve generally indicated at 60. The inner race 60 includes an outer bearing surface generally indicated at 62. The inner race 60 also includes an inner passageway 64. The outer bearing surface 62 preferably includes a groove 66. The groove 66 is the same as that described above with reference to the trolley wheel assembly 10. As with the trolley wheel assembly 10, the groove 66 of the roller turn roller 52 preferably extends at least the axial length of the passageway through the outer race 54.

In the most preferred embodiment of the roller turn roller 54, the inner race 62 extends for an axial length greater than the axial length of the outer race 54. The ends of the inner race 62 extend outward from the outer race 54, as is best seen in FIG. 5. Each end of the inner race 62 also preferably includes at least one annular seal-retaining groove 68. The seal-retaining grooves 68 are outside of the inner race 54 (as best seen in FIG. 5).

A seal in the form of an annular ring seal 70 is preferably disposed about each end of the inner race 60. The seal 70 includes a protrusion 72 for snap-fit engagement with seal-retaining grooves 68. The seal 70, as shown in FIG. 5, has a flat underside that contact the outer race 54. As can be seen, the seal 70 prevents debris from entering the mating bearing surfaces, between the outer race 54 and the inner race 60. Preferably, the seal 70 is made from a flexible polymeric material. Alternatively, the seal may have material removed form the underside surface contacting the outer race. This arrangement reduces friction between the seal 70 and the outer race 52, allowing the outer surface of the roller turn roller to rotate more freely.

To assembly a roller turn roller 52, the inner race 60 is placed within the passageway defined by the outer race 54. Once the inner race 62 is inserted, the seals 70 are snap fit onto the inner race 60 by placing the protrusion 72 into the seal-retaining grooves 68. The seals 70 retain the inner race 60 in the outer race 54, until the roller turn roller is placed in a support structure.

To secure the roller turn roller 54 with a support structure, the roller 54 is placed within the support structure. A connecting member, such as a bolt, pin, rivet or the like is inserted through the support structure and through the inner passageway 64 of the inner race 60. The connecting member is in turn passed through the opposite side of the suitable support structure and connected in a manner well known in the art. As discussed below, in connection with the trolley wheel assembly 10, the inner race 60 is secured to the support structure by the connecting member. Thus, there preferably is no relative rotation between the inner race 60 and the connecting member. The outer race 54 is rotatably supported on the inner race 60 and is free to rotate thereabout.

With the assembly made in this manner, the outer race 54 of the roller turn roller 52 rotates freely about the inner race 60. The groove 66 serves (as discussed above) to reduce the amount of surface contact between the inner bearing surface 58 of the outer race 54 and the outer bearing surface 62 of the inner race 60. This reduces the friction and prevents galling between the respective components.

As shown, the roller turn roller 54 has the grooves 66 on the outer bearing surface 62 of the inner race 60. The inner bearing surface 58 of the outer race 54 is smooth. It will be appreciated that the grove 66 could be located on the inner bearing surface 58 of the outer race 54. In this case, the outer bearing surface 62 of the inner race 60 would be smooth.

Each of the outer race 16, inner race 14 of the wheel assembly 10 and the outer race 54 and inner race 60 of the roller turn roller is preferably made of non-metallic components. These components are low-friction, self-lubricating materials. At minimum, it is preferred that the bearing surfaces of the components be made of these materials.

The preferred composition for the components includes at least one polymeric matrix material that is either a thermoset or thermoplastic material. Polymeric matrix materials that have been found to be successful include phenolic, epoxy, polyurethane, polyetherketone, ultrahigh molecular weight polyethylene, polyimide, polyphthalamide, polyphenylene sulfide, polyesters and fluoropolyers. The matrix selection is determined by the mechanical and thermal requirements of the use of the conveyor components. Combinations of matrix materials may also be used to achieve the desired properties.

The composition also includes an alloying additive or functional filler for increasing the strength, lubricity and wear resistance of the matrix material. The additive can be hard and soft particulate materials singularly or that are in combination from the graphites and refractory metals group and include materials such as molybdenum disulfide, RoyalSen pelletized master batch compositions commercially available from Sentinel Products Corporation of Hyannis, Mass., and the super-hard carbides, nitrides and oxides of titanium, boron, tungsten, tantalum, chromium or molybdenum. Such additives and fillers can also include glass fibers, boron nitride, polyaramid fibers (Kevlar®) or second-resin materials such as polyimide. It is preferred that the additive be abrasion or wear-resistant particulates also offering lubricating properties to reduce the friction.

The loading of the additive is also selected to optimize the physical properties desired in the final components. The percentage loading varies significantly, depending on the selection of the matrix material, type of additive, and desired final physical properties.

Each of the components can be made as composites by mandrel wrapping resin-rich cloth, reaction casting of high temperature fiber filled composition, compression molding, injection molding or lay-up.

Different areas of the conveyor components can be made from different compositions. For example, the bearing surface of the conveyor components may have one composition and the outer portions of the same conveyor component can have different compositions. This can be achieved easily by conventional techniques such as by molding the bearing surfaces first, and then over-molding the bearing surfaces with a material having a different composition material. In this manner, the composition of each component of the conveyor can be tailored for optimal physical and performance properties. It is also within the scope of the present invention to mold the non-metallic bearing surface over a metal substrate.

Use of the composition and especially in combination with the grooved bearing design will provide conveyor components having a novel bearing assembly that can be used over a wide temperature range, will resist abrasion and will lessen friction. The components ordinarily will not require lubrication.

The conveyor components specifically shown and described above are for a trolley wheel and roller. It will be appreciated that the invention can be used on any other conveyor component such as trolley wheels, guide rollers, wheels for enclosed track chain, CC5 chain rollers, flat top chain rollers, Fata belt rollers, hand push trolleys, traction wheel bearings, drive backup rollers, roller conveyors and roller turn rollers.

Further, the invention discloses that each of the inner and outer races comprise a non-metallic material. It will be appreciated that, in some instances, only one of the races or bearing surfaces will be made of a non-metallic material. In this case, it would be preferred that the non-metallic material have the groove described in on the bearing surface. Thus, a non-metallic bearing surface with a groove may be used in conjunction with a metallic bearing surface. This is particularly useful when the bearing surface is fixed to a fixed shaft and only includes an outer rotational race that has the groove thereon.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A non-metallic conveyor component comprising:
   a race having a bearing surface for contacting a surface and for relative rotational movement with respect to the surface, wherein said bearing surface comprises at least one matrix material and at least one additive, and said race further including a groove on said bearing surface, wherein said groove reduces friction on said bearing surface, and wherein said bearing surface is lubrication free.

2. A conveyor component as set forth in claim 1 wherein said groove is helical.

3. A conveyor component as set forth in claim 1 wherein said matrix material is selected from the group including phenolic, epoxy, polyurethane, polyetherketone, ultrahigh molecular weight polyethylene, polyimide, polyphthalamide, polyphenylene sulfide, polyesters and fluoropolymers.

4. A conveyor component as set forth in claim 3 wherein the additive is selected from the group including molybdenum disulfide, RoyalSen pelletized master batch compositions, the super-hard carbides, nitrides and oxides of titanium, boron, tungsten, tantalum, chromium, molybdenum, glass fibers, boron nitride, and polyaramid fibers.

5. A non-metallic conveyor component comprising:
   an inner race having an outer bearing surface;
   an outer race having an inner bearing surface;
   said outer bearing surface of said inner race and said inner bearing surface of said outer race having relative rotational movement therebetween and contacting one another during rotational movement; and
   at least one of the outer bearing surface on said inner race and the inner bearing surface of said outer race having a groove thereon wherein said groove reduces friction on said bearing surfaces.

6. A conveyor component as set forth in claim 5 wherein said groove is helical.

7. A conveyor component as set forth in claim 5 wherein at least one of said inner and outer bearing surfaces comprise at least one matrix material and one additive.

8. A conveyor component as set forth in claim 7 wherein said matrix material is selected from the group including phenolic, epoxy, polyurethane, polyetherketone, ultrahigh molecular weight polyethylene, polyimide, polyphthalamide, polyhenylene sulfide, polyesthers and fluoropolymers.

9. A conveyor component as set forth in claim 7 wherein said additive is selected from the group including molybdenum disulfide, RoyalSen pelletized master batch compositions, the super-hard carbides, nitrides and oxides of titanium, boron, tungsten, tantalum, chromium, molybdenum, glass fibers, boron nitride, and a polyaramid fibers.

10. A conveyor component as set forth in claim 5 wherein said inner race comprises two components adapted to be connected.

11. A conveyor component as set forth in claim 10 wherein said inner race includes a tubular sleeve having a flange and an annular ring.

12. A conveyor component as set forth in claim 11 wherein said outer race is carried on said inner race between said annular flange and said annular ring.

13. A conveyor component as set forth in claim 5 wherein said inner race has an axial length longer than the axial length of said outer race.

14. A conveyor component as set forth in claim 13 wherein the inner race includes an annular end groove on each end thereof.

15. A conveyor component as set forth in claim 14 further including a seal disposed in each of said annular end grooves of said inner race to provide a seal.

16. A conveyor component as set forth in claim 5 wherein said groove is disposed in said outer bearing surface of said inner race.

17. A conveyor component as set forth in claim 5 wherein said groove is disposed on said inner bearing surface of said outer race.

18. A conveyor component as set forth in claim 5 wherein said groove comprises a series of spaced annular grooves.

19. A conveyor component as set forth in claim 5 wherein said groove comprises a series of spaced annular flanges.

20. A conveyor component as set forth in claim 5 wherein said groove comprises a series of indentations.

21. A conveyor component as set forth in claim 5 wherein said groove comprises a series of raised areas.

* * * * *